United States Patent Office 2,995,743
Patented Aug. 8, 1961

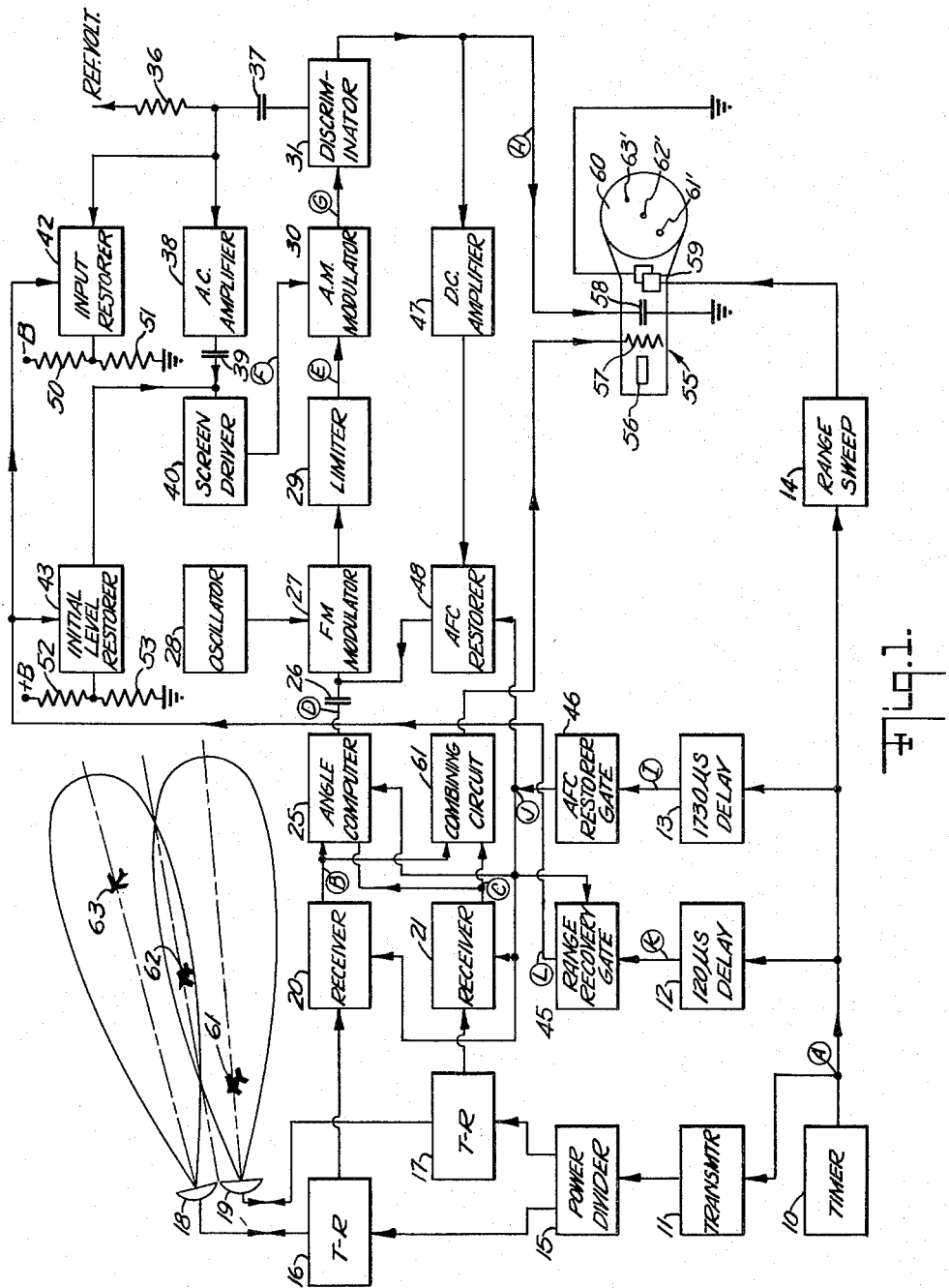

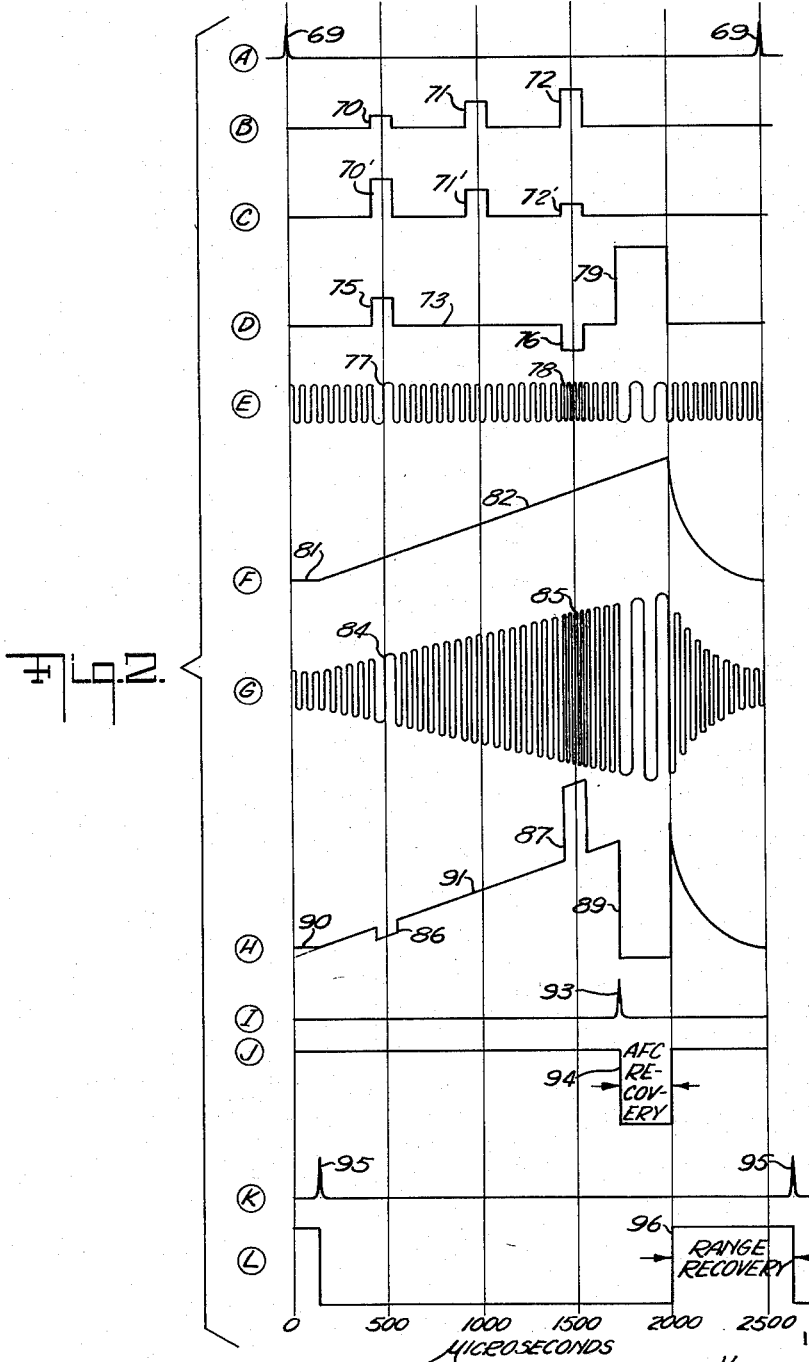

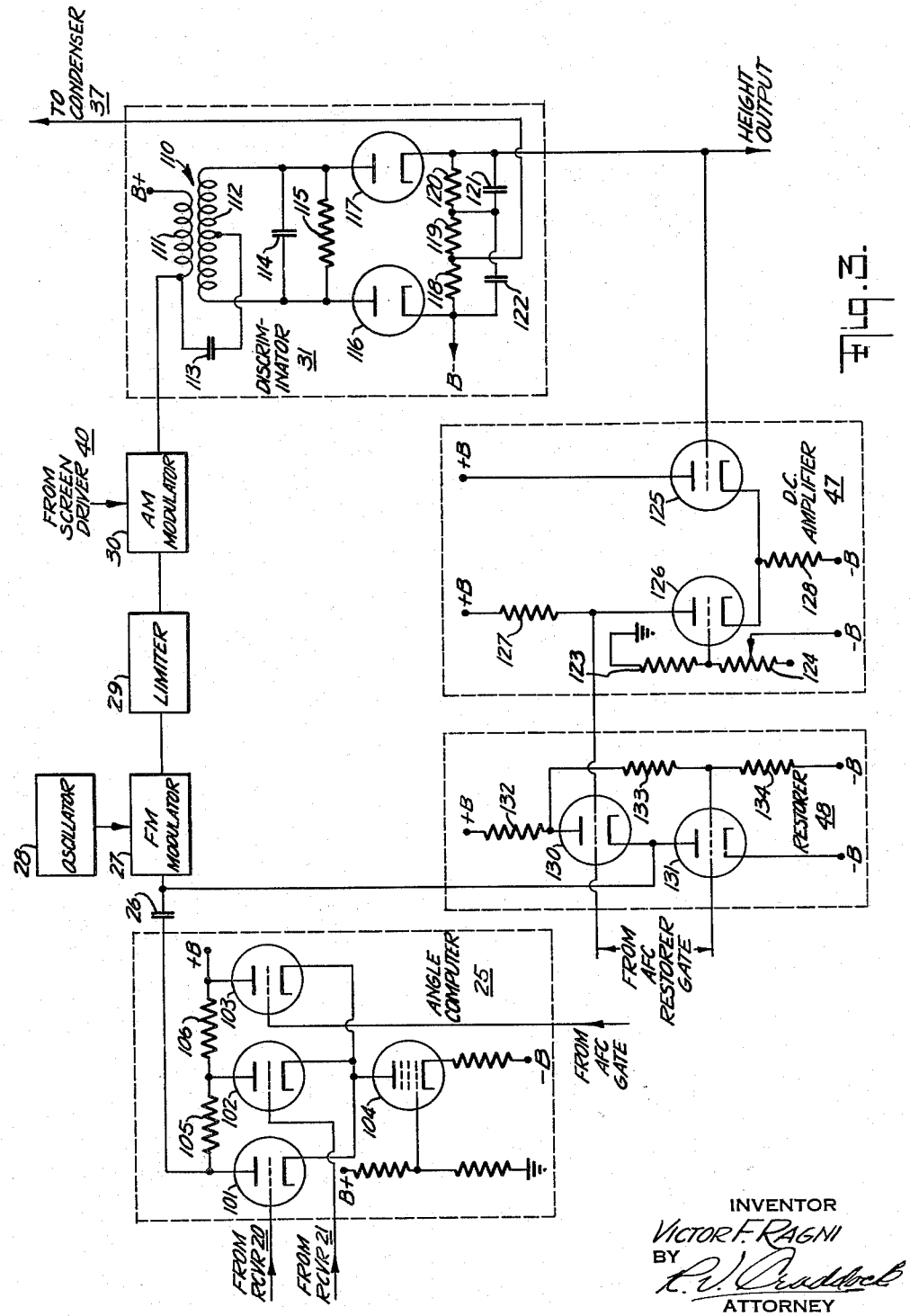

2,995,743
RANGE-HEIGHT MULTIPLIER
Victor F. Ragni, Farmingdale, N.Y., assignor to Sperry Rand Corporation, a corporation of Delaware
Filed Aug. 30, 1954, Ser. No. 452,912
19 Claims. (Cl. 343—11)

This invention relates generally to a range-height multiplier for a radar system, and more particularly to such a range-height multiplier in which a gated automatic frequency control is provided.

A radar system may derive the elevation angle of the target from the elevation angle of one or more directional beams of pulses of radio frequency energy and may determine the slant range to the target by the time required for the search pulse to travel to the target and the echo to return. However, the height of the target above the earth is sometimes necessary information, particularly if defending planes are to make rendezvous with the target. The height of the target above the horizon may be determined by multiplying the sine of the angle by the slant range. A correction for the earth's curvature may then be added if desired. This multiplication may be carried out continuously and instantly by converting the echo pulse into oscillatory energy, frequency modulated in accordance with the sine of the elevation angle and amplitude modulated in a sawtooth manner in synchronism with the radar search pulse emission, that is, in accordance with the slant range and applying this energy to a discriminator giving an output proportional to both frequency and amplitude.

For such a range-height multiplier to be accurate, it is essential that the mean frequency of the frequency modulated oscillation be precisely aligned with the center point of the discriminator conversion characteristic. Moreover, the slope and initial energy level of sawtooth envelope of the frequency modulated carrier wave must be continuously maintained with a high degree of consistency.

This invention provides a feedback circuit from the height indicator output of the discriminator to the frequency modulating component, the feedback being gated so that it is effective only during the period when there are no echoes, and in which the frequency discriminator output should be zero, or correspond to the proper center frequency of the discriminator. This invention also provides similarly gated circuits for stabilizing the slope and initial level of the amplitude modulated sawtooth wave.

A continuous, ungated frequency control feedback from the discriminator to the input of the frequency modulator is not satisfactory because of the difficulty of feeding back only the frequencies representing a drift while not feeding back the frequencies representing the intelligence being transmitted through the channel. Obviously noise will adversely affect the operation of a continuous frequency control feedback. When there is a direct current component in the intelligence signal a continuous feedback will not operate because frequencies down to zero are part of the intelligence and cannot be separated from the components of the drift frequency.

It is an object of this invention to provide an accurate range-height multiplier for a radar system.

It is also an object of this invention to provide a range-height multiplier with a gated automatic frequency control circuit.

It is a further object of this invention to provide a range-height multiplier in which the amplitude modulating saw-tooth wave is maintained with a constant slope and initial level by gating circuits.

Other objects and advantages will appear to those skilled in the art from a consideration of the following specification taken in connection with the accompanying drawing, in which:

FIG. 1 is a block diagram of a radar system embodying the principles of this invention;

FIG. 2 is a series of curves used in explaining the operation of this invention; and FIG. 3 is a schematic diagram showing the details of some of the components used in FIG. 1.

In FIG. 1, timer 10 generates a series of timing pulses which are applied to the inputs of transmitter 11, delay circuits 12 and 13 and range sweep circuit 14. Transmitter 11 is triggered by each applied timing pulse to produce a pulse of radio frequency energy, preferably in the microwave region. The radio pulses produced by transmitter 11 are applied to power divider 15 where they are equally divided into two channels which are applied respectively to T-R switches 16 and 17. T-R switch 16 is connected to antenna 18 and to receiver 20. T-R switch 17 is connected to antenna 19 and to receiver 21. T-R switches 16 and 17 are switching devices which will, on the production of a radio frequency pulse by the transmitter 11, connect the transmitter to the antennas 18 and 19, and which will, on the reception of an echo pulse by the radiating elements, connect the antennas to their respective receivers 20 and 21.

Antennas 18 and 19 may each be any means which will emit a highly directive beam of radio frequency energy in space and receive echoes from any targets which may be in the beam. Antennas 18 and 19 are arranged so that the beam radiated by antenna 19 is directed upward at a relatively low angle with the earth's surface. Antenna 18 is arranged so that it is directed upwardly at a greater angle and so that the beams emitted by the antennas 18 and 19 overlap to some extent.

Receivers 20 and 21 are conventional radio receivers for receiving an echo of the transmitted energy. They may include radio frequency amplifiers, mixers, intermediate frequency amplifiers, detectors, video amplifiers and other conventional receiver components. Receivers 20 and 21 may advantageously have logarithmic amplification characteristics to coact with the angle computer 25 in giving an accurate indication of angular information since the radiation pattern of each radio beam is substantially logarithmic over an appreciable portion of the beam width. The outputs of receivers 20 and 21 are applied to angle computer 25 which may be any circuit that will compute from the relative inputs from receivers 20 and 21, the sine of the elevational angle of the target giving rise to the echo. A typical circuit that may be used in this component will be described below.

The output of angle computer 25 is connected through condenser 26 to the input of frequency modulator 27 to which is also connected oscillator 28. Frequency modulator 27 may be any circuit which will frequency modulate the output of oscillator 28 in accordance with the amplitude of the pulse received from angle computer 25. The frequency of the carrier wave supplied by oscillator 28 should be higher than the frequency components from angle computer 25 so that the oscillator frequency will be easily separated from the degenerative circuitry. The input from angle computer 25 may be applied to a reactance tube which would in turn control the frequency of oscillator 28. A little degenerative feed back for video frequencies at the reactance tube in component 27 may be advantageous in achieving linearity of frequency modulation.

The output of frequency modulator 27 is applied to the input of limiter 29 which limits the amplitude of the frequency modulated pulses to a predetermined level. Limiter 29 has a fast time constant and minimizes any amplitude modulation inherent in the frequency modulation circuit 27. The output of limiter 29 is connected to the input of amplitude modulator 30. There is applied to another input of amplitude modulator 30 a sawtooth wave derived from the screen driver 40. The sawtooth wave produced by component 40 is initiated simultaneously with the emission of each search pulse by the radar system and rises linearly throughout the period during which an echo might be expected. The carrier wave from limiter 29 originating in oscillator 28 and frequency modulated in component 27 by the signals from angle computer 25 is applied to amplitude modulator 30 and is modulated with respect to amplitude in accordance with the level of the sawtooth wave from component 40.

The output of amplitude modulator 30 is connected to the input of discriminator 31 which may be any discriminator circuit giving an output proportional to the frequency and the amplitude of the input. Some point in the discriminator output circuit which is responsive to the instantaneous carrier level from the amplitude modulator is connected to one plate of condenser 37. The other plate of condenser 37 is connected through resistor 36 to a highly constant reference voltage.

The junction of resistor 36 and condenser 37 is connected to one input of input restorer 42 and is also connected through alternating current amplifier 38 and condenser 39 to screen driver 40. Screen driver 40 is a cathode follower, the cathode of which is directly coupled to the screen grid of an amplifying tube in amplitude modulator 30. The changing voltage applied by the screen driver 40 to the amplifying tube in the amplitude modulator changes the gain of the latter tube. The circuit of input restorer 42 will be described more in detail below. Input restorer circuit 42 may be any circuit which will, in response to a gating pulse, connect the junction of resistor 36 and condenser 37 to the junction of resistors 50 and 51. Resistors 50 and 51 form a voltage divider, the other end of resistor 50 being connected to a source of negative potential and the other end of resistor 51 being connected to ground. Input restorer 42 provides a low impedance connection when it is energized by a gating pulse and a high impedance connection at other times.

The junction of screen driver 40 and condenser 39 is connected through initial level restorer circuit 43 to the junction of resistors 52 and 53 which form a voltage divider, the other ends of resistors 52 and 53 being connected respectively to a source of positive potential and to ground. Initial level restorer 43 is a circuit which, when energized by a gating pulse, will provide a low impedance path from the reference voltage at the junction of resistors 52 and 53 to the junction of screen driver 40 and condenser 39.

The output of discriminator 31 that is indicative of the height of the target is applied to direct current amplifier 47, the output of which is applied through automatic frequency control (AFC) restorer circuit 48 to the input of frequency modulator 27. Restorer circuit 48 is a switching circuit, which during the existence of an applied gating pulse, will provide a low impedance path between amplifier 47 and the input of frequency modulator 27, presenting a high impedance at other times.

Delay circuit 12 interposes a 120 microsecond delay in the timing pulses supplied from timer 12 and applies them to range recovery gate circuit 45. Delay circuit 13 interposes a 1730 microsecond delay in the timing pulses received from timer 10 and applies them to AFC restorer gate circuit 46. AFC restorer gate 46 produces at its output a negative gate pulse, the leading edge of which is 1730 microseconds after the leading edge of the corresponding timing pulse and which has a duration of 270 microseconds. This output of AFC restorer gate 46 is applied to AFC restorer circuit 48 and also to range recovery gate 45.

Range recovery gate circuit 45 generates for each delayed timing pulse applied thereto a gating pulse, the leading edge of which occurs 2000 microseconds after the leading edge of the corresponding timing pulse and which has a duration of 620 microseconds lasting 120 microseconds after the succeeding timing pulse. Range recovery gate circuit 45, which may be a bistable multivibrator circuit, is tripped to form the leading edge of the range recovery gate by the occurrence of the trailing edge of a pulse from the AFC restorer gate circuit. The next delayed timer pulse from circuit 12 again trips the multivibrator in range recovery gate circuit 45 causing the occurrence of the trailing edge of the pulse. The output of range recovery gate circuit 45 is applied to initial level restorer circuit 43 and input restorer circuit 42. The output of AFC circuit restorer gate 46 is also applied to receivers 20 and 21 so that these receivers are disabled during the occurrence of the restorer gate.

The output of discriminator circuit 31 indicative of height is also applied to one of the vertical deflection plates 58 of cathode ray tube 55, which also includes electron gun 56, control grid 57, horizontal deflection plates 59 and screen 60. The outputs of receivers 20 and 21 are also applied to combining circuit 61 where these outputs are added together and applied to the control grid 57 of cathode ray tube 55. The output of range sweep circuit 14 is connected to the horizontal deflection plates of cathode ray tube 55.

In the operation of the system shown in FIG. 1, the timing pulses 69 produced in timer 10 (seen in plot A of FIG. 2) each initiate the production of a high frequency radio pulse in transmitter 11 which is applied to power divider 15. Power divider 15 equally divides the radio frequency pulses into two conduits which are respectively connected to T-R devices 16 and 17. T-R devices 16 and 17 prevent the application of the powerful radio search pulses from being applied to and disabling receivers 20 and 21 and channel these radio pulses to antennas 18 and 19 respectively, which radiate a highly directional beam of radio search pulses through space.

If the search pulses emitted by antennas 18 and 19 impinge upon an object in space, reflections will result which are received by antennas 18 and 19 and respectively applied to T-R devices 16 and 17, which now operate to apply these weak echo pulses to receivers 20 and 21 respectively.

The outputs of receivers 20 and 21 are shown in plots B and C respectively of FIG. 2. It will be seen that a low-flying target, such as 61 in FIG. 1, will give rise to a relatively weak echo 70 in receiver 20 and a relatively strong echo 70' in receiver 21. A medium-altitude target, such as 62, will give rise to approximately equal and medium amplitude echoes 71 and 71' in receivers 20 and 21. A high-flying target, such as 63, will give rise to a relatively strong echo 72 in receiver 20 and relatively weak echo 72' in receiver 21. These outputs of receivers 20 and 21 are applied to angle computer 25.

Assuming for the purpose of this illustration that angle computer 25 normally gives an output of about 5 volts, echoes from low flying target 61, having an elevational angle of about 5 degrees, would cause angle computer 25 to produce a pulse 75 (shown in plot D of FIG. 2) of about 2½ volts above normal. Target 62 having an elevational angle of about 10 degrees, is accurately represented by the normal 5 volts in the output of the angle computer and would cause no pulse to be produced in its output. High flying target 63, at an angle of about 15 degrees in elevation, would cause a pulse 76 about 2½ volts more negative than the normal 5 volt output. The application of the output of the AFC restorer gate circuit to the angle computer 25 gives rise to the AFC recovery pulse 79 in plot D. Pulse 79 has an amplitude corresponding to zero elevation angle and the cross-over frequency of discriminator 31. The vertical distance between the top of pulse 79 and the top of pulse 75 represents the sine of the elevation angle of target 61, while the vertical distances between the top of pulse 79 and the line 73 and the bottom of pulse 76 represents respectively the sines of the elevation angles of targets 62 and 63.

The pulses from the angle computer 25 frequency modulate the carrier wave from oscillator 28 in accordance with the amplitude of the applied pulses giving rise to the variations in frequency, seen at 77 and 78 of plot E. Limiter 29 insures that these pulses of frequency modulated oscillatory energy are of a constant height when they are applied to amplitude modulator 30.

The sawtooth wave applied by the screen driver 40 to amplitude modulator 30 has the shape shown in plot F of FIG. 2. For the first 120 microseconds, corresponding to 10 miles of range, the voltage from screen driver 40 is constant as indicated at 81 in plot F and then rises linearly to a point 2000 microseconds after the timing pulse. The slope of the rising portion 82 of curve F is such that its height is proportional to time measured from the origin. The flat portion 81, occurring within the severe clutter region, obviates the necessity of requiring the amplitude modulator to modulate to zero level and requiring the discriminator to operate in the usually non-linear regions near zero level. The voltage then rapidly falls through the next 500 microseconds and begins a new cycle. The frequency modulated carrier wave is now amplitude modulated in accordance with range as seen in plot G of FIG. 2, the variations in frequency at 84 and 85 corresponding to the angles indicated by pulses 75 and 76 in plot D.

The frequency and amplitude modulated carrier wave seen in plot G of FIG. 2 is applied to discriminator 31 which produces the output shown in plot H of FIG. 2 wherein pulses 86 and 87 have an amplitude above the base 90 indicative of the height of the targets 61 and 63 respectively. The height of target 62 is indicated by the amplitude of the signal above the base 90 at the point 91, the range of target 62. The output of discriminator 31 is applied to control the vertical deflection of cathode ray tube 55. The intensity of the trace of cathode ray tube 55 is controlled by combining circuit 61 to produce an intensified trace whenever an echo is received. The screen 60 of cathode ray tube 55 shows range horizontally and height vertically. The range sweep is provided by component 14 under the control of timer 10. Targets 61, 62 and 63 are indicated as to their range and height by intensified traces 61', 62' and 63' respectively on screen 60.

Having described the operation of the system of FIG. 1 with respect to the received echoes and the display thereof, particular attention will now be given to said operation with respect to the stabilizing features.

Delay circuit 13 produces at its output a series of pulses 93 as shown in plot I of FIG. 2, each pulse occurring 1730 microseconds after a corresponding timing pulse 69 produced by timer 10. The AFC restorer gate circuit 46 produces in response to each of the delayed pulses 93 shown in plot I, a pulse 94 which has a leading edge corresponding in time with a pulse 94 and which is 270 microseconds in duration as shown in plot J. These pulses 94 are applied to AFC restorer circuit 48 and are also applied to the range recovery gate circuit 45.

Range recovery gate circuit 45 also receives from delay circuit 12 a series of pulses 95 as shown in plot K of FIG. 2, each delayed 120 microseconds after the timing pulses 69 shown in A. Range recovery gate circuit 45 generates a series of range recovery gating pulses 96 shown at plot L in FIG. 2. The leading edge of these pulses is coincident in time with the trailing edge of the AFC restoring pulses 94 shown in plot J. The trailing edge of the range recovery pulses 96 shown in plot L, is coincident in time with the pulses 95 shown in plot K. The range recovery gating pulses 96 are applied to restorer circuits 43 and 42.

On the occurrence of a timing pulse 69 and beginning of a radar cycle, input restorer circuit 42 is energized from component 45 by a range recovery pulse 96 as shown in plot L of FIG. 2, connecting the junction of resistor 36 and condenser 37 to the junction of resistors 50 and 51, a point of reference potential. This reference potential is applied to the junction of resistor 36 and condenser 37 from the 2000 microsecond point of a preceding cycle through to the 120 microsecond point of the succeeding cycle, and insures that the condenser 37 is always charged at the correct reference level at the beginning of the linear rise. This prevents a variation in slope due to a difference in charge on condenser 37. At the end of 120 microseconds and on the disappearance of pulse 96, the input restorer circuit 42 is changed into an open circuit and the upper plate of condenser 37 begins to charge positively. However, the bottom plate of condenser 37 is connected to a point on discriminator 31 which swings negatively almost as fast as the upper plate swings positively. Hence, there is little change in potential across the plates of condenser 37 and there is a tendency for the voltage of the upper plate to rise in a linear fashion. This small rise in potential of the upper plate of condenser 37 is amplified in amplifier 38 and applied through condenser 39 to the screen driver 40, which applies the amplitude modulating saw tooth wave to component 30. Degenerative feedback from the amplitude sensitive point of discriminator 31 to the bottom plate of condenser 37 affords a means of minimizing any nonlinearities that may exist in the sawtooth generating loop, especially the amplitude modulator 30 and discriminator 31.

For the duration of range recovery pulse 96 the initial level restorer circuit 43 also presents a low impedance circuit between the junction of resistors 52 and 53 and the junction of screen driver 40 and condenser 39. This insures that the initial flat portion 69 of the voltage curve in plot D of FIG. 2 is always at the same level.

The output representing height from the discriminator 31 is applied through direct current amplifier 47 and restorer circuit 48 to the input of frequency modulator 27. Restorer circuit 48 presents a low impedance between the amplifier 47 and the input of the frequency modulator 27 only during the existence of AFC restorer gate pulse 94. Receivers 21 and 20 are disabled by the AFC gate pulse and hence no echo pulses are applied to the frequency modulator 27 for the duration of a pulse 94. The discriminator output should, therefore, be at a voltage indicative of zero height during a pulse 94. If some voltage other than this appears at the output of discriminator 31, it is amplified in amplifier 47 and passed through restorer 48 to place a correcting charge on condenser 26.

FIG. 3 shows more in detail the angle computer 25, the restorer 48, the direct current amplifier 47 and the discriminator 31, which are shown in FIG. 1. Angle computer 25 includes three triodes 101, 102 and 103, the cathodes of which are connected together and to the plate of pentode 104. The plate of triode 101 is connected to the plate of triode 102 through a resistor 105. The plate of triode 102 is connected to the plate of triode 103 through resistor 106 and also to a source of B plus. The output of receiver 20 is connected to the grid of triode 101. The output of receiver 21 is connected to the grid of triode 102. The AFC restorer gate pulse from component 46 is applied to the grid of triode 103. The output of the angle computer 25 is taken from the plate of triode 101 and applied through condenser 26 to the input of frequency modulator 27.

The output of amplitude modulator 30 is connected to primary 111 of transformer 110 in the phase discriminator 31 and is also connected through condenser 113 to the center tap of secondary 112 of transformer 110. The other terminal of primary 111 is connected to a source of positive potential. Condenser 114 and resistor 115 are connected in parallel and across the end terminals of secondary 112. The plate of diode 116 is connected to one end of resistor 115 and the plate of diode 117 is connected to the other end of this resistor, One end of resistor 118 is connected to the cathode of diode 116. One end of resistor 120 is connected to the cathode of diode 117. The other ends of resistors 118 and 120 are connected together through resistor 119. The junction of resistors 118 and 119 is connected to condenser 37 (shown in FIG. 1). Resistor 120 is shunted by condenser 121. The output of the phase discriminator 31 indicative of height is taken from the cathode of diode 117. Resistors 118 and 119 are shunted by condenser 122. The cathode of diode 116 is tied to a suitable bias voltage for proper operation of the D.C. amplifier 47. This bias voltage is obtained in a manner similar to that providing the bias for the grid of triode 126 so that variations in the bias supply will tend to leave the voltage at the plate of triode 126 unchanged. Any output circuit used must incorporate the same feature of compensation to bias voltage effects as in D.C. amplifier 47.

The discriminator output taken from the cathode of diode 117 is also connected to the control grid of triode 125 in direct current amplifier 47. This amplifier also contains another triode 126, the cathode of which is connected to the cathode of triode 125 and through resistor 128 to a source of negative potential.

The grid of triode 126 is connected to the junction of resistors 123 and 124, the other ends of which are connected respectively to ground and to a source of negative potential. Resistor 124 is adjustable. The plate of triode 126 is connected through resistor 127 to a source of positive potential, and is also connected to the control grid of triode 130 in restorer circuit 48. The plate of triode 130 is connected through resistor 132 to a source of positive potential. The cathode of triode 130 is connected to the plate of triode 131. The cathode of triode 131 is connected to a source of minus potential. The plate of triode 130 is connected through resistors 133 and 134 connected in series to a source of minus potential. The grid of triode 131 is connected to the junction of resistors 133 and 134. The input from the automatic frequency control restorer gate circuit is applied to the grids of both tubes 130 and 131.

An explanation will now be given of the operation of the components shown in detail in FIG. 3. In angle computer 25, the pentode 104 has its control grid maintained at a fixed potential and it becomes a constant current generator. The current that flows from the plate of pentode 104 and through the network including tubes 101, 102, 103 and resistors 105 and 106 to B plus is maintained constant regardless of the impedance of tubes 101, 102, 103.

Low-flying target 61 causes relatively low amplitude pulse such as 70 in plot B to be applied through receiver 20 to the control grid of triode 101 and a relatively high amplitude pulse such as 70' in plot C to be applied through receiver 21 to the control grid of triode 102. This causes the bulk of the current to flow through triode 102 and a minor portion of the current to flow through the triode 101. Hence, most of the current is going through only resistor 106. This results in a relatively low voltage drop through resistors 105 and 106. This voltage drop subtracted from B plus results in a relatively high voltage (pulse 75 of plot D in FIG. 2) appearing at the plate of triode 101, the output connection of the angle computer 25.

The detection of a target at a medium altitude angle results in equal and medium amplitude pulses 71 and 71' in plots B and C being applied through receivers 20 and 21 to the control grids of triodes 101 and 102 respectively. This causes triodes 101 and 102 to conduct equally and the voltage at the plate of triode 101 is at a medium amplitude as though no target at all were detected.

The detection of a high flying target, such as 63 in FIG. 1 causes a relatively high amplitude pulse such as 72 in plot B to be applied through receiver 20 to tube 101 and a relatively low amplitude pulse such as 72' in plot C to be applied through receiver 21 to the grid of tube 102. This causes triode 101 to be more conductive than triode 102 and the majority of the current flows through resistors 105 and 106 and the minority of the current flows only through resistor 106. This results in a relatively high voltage drop across the resistors 105 and 106. This voltage drop when substracted from B plus results in a relatively low amplitude voltage (pulse 76 of plot D in FIG. 2) at the plate of tube 101. The characteristics of triodes 101, 102, and 103 and the values of resistors 105 and 106 are so chosen that the output of angle computer 25 is representative of the sine of the elevational angle of a target supplying echo signals to the grids of triodes 101 and 102.

At some time interval beyond the normal range of the radar system, the automatic frequency control restorer gate applies a gating pulse, such as seen in plot J of FIG. 2, to the control grid of triode 103. This causes triode 103 to be fully conductive and applies substantially a short circuit between B plus and the plate of pentode 104, resulting in little or no voltage drop across resistors 105 and 106 and causing the plate of triode 101 to become substantially full B plus as seen at 79 in plot D.

The height output from discriminator 31 is applied to the control grid of triode 125 in the direct current amplifier 47 causing that tube to become more or less conductive. This tube is connected as a cathode follower and the cathode accordingly rises and falls in potential. The cathode of triode 126 is directly connected to the cathode of triode 125 and accordingly the cathode of 126 correspondingly rises and falls in potential. Since the grid of triode 126 is fixed in potential, this causes the plate of tube 126 to rise and fall. The plate of triode 126 is directly connected to the grid of cathode follower tube 130 in restorer circuit 48. When tubes 130 and 131 are conducting, the cathode of tube 130 rises and falls in accordance with the variations in potential on the grid. These variations are applied to frequency modulator 27 by direct connection between the cathode of triode 130 and the input to frequency modulator 127. The cathode resistor of triode 130 is comprised of triode 131.

The grids of tubes 130 and 131 are both connected to the output of the automatic frequency control restorer gate. When this positive gate is applied to these triodes, a low impedance is presented between the plate of triode 126 in direct current amplifier 47 and the input to the frequency modulator 27. When the gate pulse is not present, tubes 130 and 131 are cut-off and a very high impedance is presented between the input of frequency modulator 27 and the plate of triode 127. Moreover, when tube 131 is cut-off, the input of frequency modulator 27 is not connected through impedance to ground as it would be were an ordinary resistor used as a cathode resistor of tube 130. Upon the cessation of an AFC restorer gate pulse 94 triodes 131 and 132 are cut off with such speed that the voltage at the junction of condenser 26 and frequency modulator 27 cannot discharge from the level set during the existence of the pulse 94. Cathode follower triode 125 of amplifier 47 acts as an isolation stage for the height output of the phase discriminator. The connection from the junction of resistors 133 and 134 provides a feedback which reduces the output impedance of restorer 48. Tubes 125 and 126 form a cathode-coupled direct current amplifier of stable characteristic.

Variable resistor 124 connected to the grid of tube 126 provides a zero adjustment. The circuits in components 42 and 43 may be essentially the same as that shown in FIG. 3 for restorer circuit 48.

It will be seen that this invention provides a gated feedback circuit which insures that the mean frequency of the frequency modulator 27 is at the cross-over point of the conversion characteristic of discriminator 31, a condition which is essential for accurate height indication. Moreover, this invention provides a way for insuring that the initial level and slope of the sawtooth wave applied to the amplitude modulator 30 is maintained with a high degree of constancy, an essential requirement for accurate height indication.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radar system a transmitter for radiating a series of directional radio frequency pulses, receiving means for receiving echoes reflected from objects impinged upon by said pulses, angle computing means connected to said receiving means for producing a pulse having an amplitude proportional to the sine of the elevational angle to each reflecting object, frequency modulating means connected to said angle computer for producing a carrier wave energy modulated in frequency in accordance with the amplitude of each applied pulse, discriminator means connected to the output of said frequency modulating means for producing an output having an amplitude proportional to the frequency of the applied pulses, gated feedback means connected to the output of said discriminator and to the input of said frequency modulator to align the mean frequency of said carrier wave energy with the zero response characteristic of the discriminator, said feedback means being gated to be operable only during a predetermined portion of the interval between said radio frequency pulses.

2. A radar system in accordance with claim 1 in which the predetermined portion of the interval between said radio frequency pulses is positioned outside the normal range of said radar system.

3. A radar system in accordance with claim 1 in which means are provided to disable said receiving means during said predetermined portion of the interval between said radio frequency pulses.

4. A radar system in accordance with claim 1 in which an amplitude modulator is connected between the frequency modulator and said discriminator means, said amplitude modulator being supplied with a sawtooth wave and operating to amplitude modulate the output of said frequency modulator in accordance with the amplitude of said sawtooth wave, said discriminator means giving an ouput proportional to frequency and amplitude.

5. A gate stabilized frequency modulator including a frequency modulator for producing a frequency modulated wave, the mean frequency of which can be varied, a discriminator the input of which is connected to the output of said frequency modulator, a periodically energized gated circuit connecting the output of said discriminator to the input of said frequency modulator to vary said mean frequency of said frequency modulated wave only during predetermined periods, means for causing the input to said discriminator to have a predetermined amplitude during said predetermined periods.

6. The combination of claim 5 in which said gated circuit includes a direct current amplifier, the input of which is directly connected to said discriminator output and the output of which is directly connected through a gated cathode follower tube to the input of said frequency modulator.

7. The combination of claim 5 in which said gated circuit includes a direct current amplifier, the input of which is directly connected to said discriminator output and the output of which is directly connected through a cathode follower tube to the input of said frequency modulator, the cathode resistor of said cathode follower tube including an electronic discharge device having a control grid and in which the control grids of said cathode follower and said electron discharge device are gated.

8. The combination of claim 5 in which there is provided a cathode follower, the input of which is connected to the ouput of the discriminator, an amplifier tube having a cathode grid and plate, the cathode of which is connected to the cathode of said cathode follower and in which the gated circuit includes a switch tube and a cathode load tube each of which have cathode, grid and plate electrodes, the plate of said switch tube being connected to the grid of said load tube, and the cathode of said switch tube being connected to the plate of a cathode load tube and to said frequency modulator to vary the frequency thereof, the grids of said switch and load tubes being connected to a source of gating pulses.

9. The combination of claim 5 in which a limiter stage and a stage of amplitude modulation is connected between the output of said frequency modulator and the input of said discriminator, the modulation of said amplitude modulator being controlled by the application of a sawtooth wave thereto.

10. The combination of claim 9 in which a gated circuit is utilized to stabilize the slope of said sawtooth wave.

11. The combination of claim 9 in which a gated circuit is utilized to stabilize the initial energy level of said sawtooth wave.

12. In combination, an amplitude modulator having a signal input, a modulation input, and an output connected to control the input of a discriminator, a first condenser, one terminal of which is connected through a resistor to a source of reference voltage, the junction of said resistor and first condenser being connected through an alternating current amplifier to one terminal of a second condenser, the other terminal of which is connected through a cathode follower stage to said modulation input, a source of periodical gating pulses, an input restorer circuit under control of said gating pulses for periodically connecting said junction to a reference potential causing a slowly rising and rapidly falling potential variation to appear across said first condenser, the other terminal of said condenser being connected to a point in said discriminator which opposes said potential variation.

13. The combination of claim 12 in which the junction of said second condenser and said cathode follower stage is connected through a restorer circuit to a reference potential, said restorer circuit operating under control of said gating pulses to periodically connect said last-mentioned junction to said reference potential.

14. A source of amplitude modulated pulses occurring within a recurring time interval separated by an interval in which no pulses occur, a frequency modulator having a local oscillator for providing a carrier wave, means to connect said source to said frequency modulator to frequency modulate said carrier in accordance with said amplitude modulation, a discriminator having an input to which is applied said frequency modulated pulses to produce an output proportional to said frequency modulation, a direct current amplifier, the input of which is connected to said discriminator and the output of which is connected to said frequency modulator through a switching device to vary the mean frequency of said frequency modulated carrier, a gating circuit operating to connect said output of said direct current amplifier to said frequency modulator only during said intervals in which no pulses occur.

15. The combination of claim 14 in which an amplitude modulator is connected between said frequency modulator and said discriminator to modulate said frequency modulated carrier wave in amplitude in accordance with a sawtooth wave.

16. In combination, an input consisting of recurring pulses having an amplitude representative of the elevational angle of an object and a position in time representative of range to said object, an oscillator for producing oscillatory energy, a frequency modulator connected to said input for producing a carrier wave modulated in frequency in accordance with the amplitude of said input pulses, an amplitude modulator connected to said frequency modulator output for amplitude modulating said frequency modulated carrier wave, a discriminator connected to said amplitude modulated output for producing an output proportional to the amplitude and to the frequency of said carrier wave, a feedback circuit connected from said discriminator output to said local oscillator to control the frequency thereof, a gating circuit in said feedback circuit acting to complete said feedback circuit only during a period when none of said input pulses are expected.

17. The combination of claim 16 in which means are connected to said amplitude modulating means to produce a recurrent sawtooth wave, gated circuitry being provided to cause said sawtooth wave to be stabilized as to slope and initial energy level.

18. The combination of claim 14 in which there are provided means to cause said amplitude modulated pulses to have a predetermined amplitude during said intervals.

19. The combination of claim 1 in which means are provided to cause the angle computer to produce a pulse representative of the since of 0° angle during said predetermined portion of said interval.

References Cited in the file of this patent

UNITED STATES PATENTS

| | | |
|---|---|---|
| 2,469,875 | Fyler | May 10, 1949 |
| 2,684,478 | Fox | July 20, 1954 |

OTHER REFERENCES

MIT Rad. Lab. Series, vol. I, Radar System Engineering, pages 545–547.